United States Patent
Kim et al.

(10) Patent No.: US 8,963,945 B2
(45) Date of Patent: Feb. 24, 2015

(54) SYSTEM AND METHOD FOR GENERATING RGB PRIMARY FOR WIDE GAMUT, AND COLOR ENCODING SYSTEM USING RGB PRIMARY

(75) Inventors: Yun-Tae Kim, Yongin-si (KR); Seo Young Choi, Yongin-si (KR); Ho Young Lee, Yongin-si (KR); Du-Sik Park, Yongin-si (KR); Ji Young Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 13/497,418

(22) PCT Filed: Sep. 17, 2010

(86) PCT No.: PCT/KR2010/006381
§ 371 (c)(1),
(2), (4) Date: Mar. 21, 2012

(87) PCT Pub. No.: WO2011/034366
PCT Pub. Date: Mar. 24, 2011

(65) Prior Publication Data
US 2012/0281010 A1    Nov. 8, 2012

(30) Foreign Application Priority Data
Sep. 21, 2009  (KR) .................. 10-2009-0089049

(51) Int. Cl.
*G09G 5/00* (2006.01)
*G09G 5/02* (2006.01)
(Continued)

(52) U.S. Cl.
CPC ...................................... *H04N 9/67* (2013.01)
USPC ........... 345/590; 345/591; 345/600; 345/606; 345/690; 348/254; 348/557; 348/683; 358/519; 358/525; 382/167; 382/252; 382/274; 382/276

(58) Field of Classification Search
USPC ......... 345/581, 589, 590, 591, 600, 601, 606, 345/617–618, 690; 348/254–256, 557, 560, 348/568, 571, 630, 642, 649, 674, 683, 348/727; 358/518–519, 520–525, 530, 533, 358/539, 445–448; 382/162, 166–167, 232, 382/251–252, 253, 254, 274, 276
See application file for complete search history.

(56) References Cited

U.S. PATENT DOCUMENTS 5,216,496 A * 6/1993 Miyamoto et al. ............ 348/237
5,412,427 A * 5/1995 Rabbani et al. ............ 348/394.1
(Continued)

FOREIGN PATENT DOCUMENTS

JP   2004-200902   7/2004
JP   2009-506358   2/2009
(Continued)

OTHER PUBLICATIONS

International Search Report for PCT/KR2010/006381 mailed May 2, 2011.
(Continued)

*Primary Examiner* — Wesner Sajous
(74) *Attorney, Agent, or Firm* — NSIP Law

(57) ABSTRACT

A red, green, and blue (RGB) primary generation system and method for a wide color gamut, and a color encoding system using the RGB primaries. The RGB primary generation system may achieve a wide color gamut by generating a color gamut having a gamut coverage which meets a gamut coverage threshold, meeting a unique hue, having a maximum gamut efficiency, and a minimum quantization error.

20 Claims, 9 Drawing Sheets

(51) Int. Cl.
*H04N 5/202* (2006.01)
*H04N 5/46* (2006.01)
*H04N 5/52* (2006.01)
*H04N 1/46* (2006.01)
*G06F 3/08* (2006.01)
*G06K 9/00* (2006.01)
*G06K 9/40* (2006.01)
*G06K 9/36* (2006.01)
*H04N 9/67* (2006.01)

(56) References Cited

U.S. PATENT DOCUMENTS

| | | | | |
|---|---|---|---|---|
| 6,134,347 | A * | 10/2000 | Niwamoto | 382/166 |
| 6,684,000 | B1 * | 1/2004 | Sakurai et al. | 382/324 |
| 6,823,083 | B1 * | 11/2004 | Watanabe et al. | 382/167 |
| 7,750,919 | B2 | 7/2010 | Bang et al. | |
| 7,777,756 | B2 | 8/2010 | Kwak et al. | |
| 2003/0164968 | A1 * | 9/2003 | Iida | 358/1.9 |
| 2004/0113876 | A1 * | 6/2004 | Motomura | 345/87 |
| 2006/0170792 | A1 * | 8/2006 | Edgar | 348/234 |
| 2007/0091114 | A1 | 4/2007 | Kwak et al. | |
| 2007/0091213 | A1 | 4/2007 | Jaspers | |
| 2007/0201063 | A1 | 8/2007 | Bang et al. | |
| 2008/0080767 | A1 | 4/2008 | Cho et al. | |
| 2009/0154803 | A1 * | 6/2009 | Mizukura et al. | 382/166 |
| 2009/0310154 | A1 * | 12/2009 | Morovic et al. | 358/1.9 |
| 2012/0320115 | A1 * | 12/2012 | Ben-David et al. | 345/694 |
| 2014/0009637 | A1 * | 1/2014 | Ishimoto et al. | 348/223.1 |

FOREIGN PATENT DOCUMENTS

| | | |
|---|---|---|
| KR | 10-2007-0043535 | 4/2007 |
| KR | 10-2007-0088108 | 8/2007 |
| KR | 10-2008-0030339 | 4/2008 |

OTHER PUBLICATIONS

Chinese Office Action issued on Feb. 7, 2014 in corresponding Chinese Application No. 201080042139.2.

Youngshin Kwak et al.: "Optimal chromaticities of the primaries for wide gamut 3-channel display", Proc. of SPIE—IS&T Electronic Imaging, SPIE vol. 5667, 2005, pp. 319 to 327.

Lázló Beke et al.: "Optimal color primaries for three- and multiprimary wide gamut displays", Journal of Electronic Imaging, vol. 17, No. 2, Apr.-Jun. 2008, pp. 023012-1 to 023012-15.

International Telecommunication Union, ITURBT. Recommendation ITU-R BT.709-5 (Apr. 2002), "709-5 Parameter values for the HDTV standards for production and international programme exchange," 2009, pp. 1 to 30.

* cited by examiner

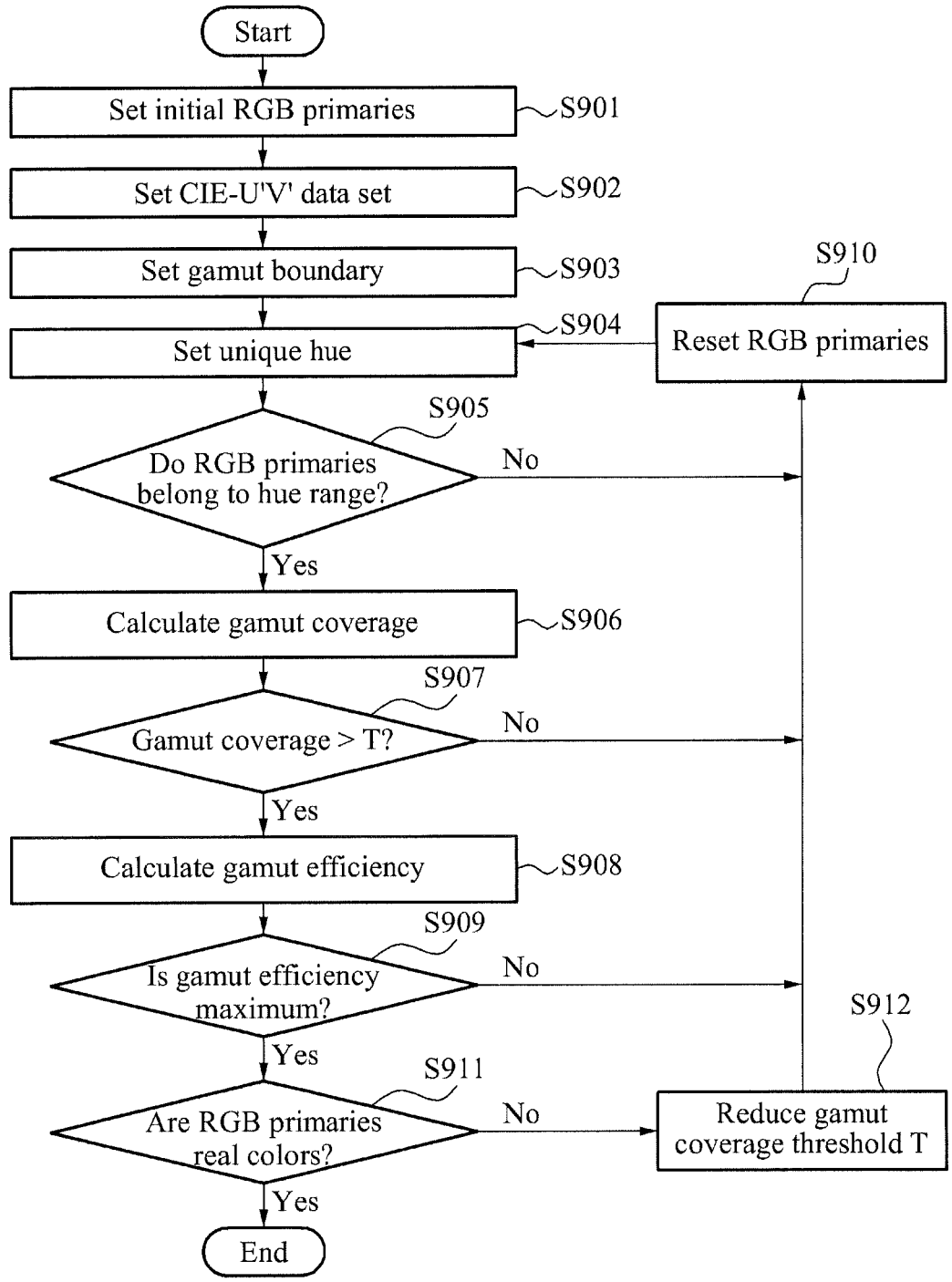

SYSTEM AND METHOD FOR GENERATING RGB PRIMARY FOR WIDE GAMUT, AND COLOR ENCODING SYSTEM USING RGB PRIMARY

CROSS-REFERENCE TO RELATED APPLICATIONS

This application is a U.S. National Phase application of PCT/KR2010/006381 filed Sep. 17, 2010 and claims the priority benefit of Korean Application No. 10-2009-0089049 filed Sep. 21, 2009 in the Korean Intellectual Property Office, the contents of both of which are incorporated herein by reference.

BACKGROUND

1. Field

Example embodiments of the following disclosure relate to a system and method for generating red, green, and blue (RGB) primary signals, and more particularly, to a system and method for generating RGB primaries for a wide color gamut using a unique hue, a gamut coverage, and a gamut efficiency.

2. Description of the Related Art

In color encoding in an image capturing device and a video device, a standard red, green, and blue (sRGB) color space is used. When the sRGB color space was first introduced, a gamut size did not matter because analog film cameras, cathode-ray tube (CRT) televisions (TV), and monitors were used as display devices. However, in recent days, almost all video input and output devices are in a digital form. In addition, a high-powered digital single lens reflect (DSLR) camera is capable of capturing a wider color gamut than a color gamut of the sRGB. Accordingly, the display devices are now capable of achieving the wide color gamut. Nevertheless, since color encoding in the video input and output device still applies the sRGB system, the wide gamut data being acquired and outputted is clipped.

SUMMARY

Additional aspects and/or advantages will be set forth in part in the description which follows and, in part, will be apparent from the description, or may be learned by practice of the invention.

According to example embodiments, there is provided a red, green, and blue (RGB) primary generation system including an RGB primary setting unit to set RGB primaries, a gamut boundary setting unit to set a gamut boundary of a reference gamut using a data set in a particular color space, a gamut coverage determining unit to determine whether a gamut coverage of a target gamut meets a gamut coverage threshold, using the reference gamut and the target gamut based on the RGB primaries, and a gamut efficiency determining unit to determine whether a gamut efficiency of the target gamut is at a maximum, using the target gamut and the reference gamut, when the gamut coverage meets the gamut coverage threshold.

The RGB primary generation system may further include a unique hue determining unit to determine whether the set RGB primaries belong to a range of a unique hue for maintaining a locus recognized as the same hue.

The RGB primary generation system may further include an RGB determining unit to control the gamut coverage threshold by determining whether the RGB primaries are real colors.

According to other example embodiments, there is provided an RGB primary generation method including setting RGB primaries, setting a gamut boundary of a reference gamut using a data set in a particular color space, determining whether a gamut coverage of a target gamut meets a gamut coverage threshold, using the reference gamut and the target gamut based on the RGB primaries, and determining whether a gamut efficiency of the target gamut is at a maximum, using the target gamut and the reference gamut, when the gamut coverage meets the gamut coverage threshold.

According to other example embodiments, there is provided an RGB primary generation system for generating RGB primaries in the Commission Internationale de L'eclairage (CIE)-u'v' color space, the RGB primary generation system including a subset $\{R, G, B\} = \{(0.5399, 0.5190), (0.035, 0.5859), (0.165, 0.1182)\}$ when a coordinate set of color spaces of the RGB primaries is $\{R, G, B\} = \{(u1, v1), (u2, v2), (u3, v3)\}$.

According to other example embodiments, there is provided a color encoding system using RGB primaries, the color encoding system performing color encoding using luma and color-difference calculations equations according to below equation.

$$E'_Y = 0.29655 E'_R + 0.6497 E'_G + 0.0538 E'_B$$

$$E'_{CB} = \frac{0.5}{(1-0.0538)}(E'_B - E'_Y) = -0.1567 E'_R - 0.3433 E'_G + 0.5000 E'_B$$

$$E'_{CR} = \frac{0.5}{(1-0.2965)}(E'_R - E'_Y) = 0.5000 E'_R - 0.4618 E'_G - 0.0382 E'_B$$

where E' denotes a nonlinear component.

The color encoding system may perform quantization using the following equations:

$$D_{Y'} = \text{INT}[(219 E_{Y'} + 16) \cdot 2^{n-8}]$$

$$D_{R'} = \text{INT}[(219 E_{R'} + 16) \cdot 2^{n-8}]$$

$$D_{CB'} = \text{INT}[(224 E_{CB'} + 128) \cdot 2^{n-8}]$$

$$D_{G'} = \text{INT}[(219 E_{G'} + 16) \cdot 2^{n-8}]$$

$$D_{CR'} = \text{INT}[(224 E_{CB'} + 128) \cdot 2^{n-8}]$$

$$D_{B'} = \text{INT}[(219 E_{B'} + 16) \cdot 2^{n-8}]$$

where "n" denotes a number of bit-length of quantized RGB, luma, and color-difference signals.

According to other example embodiments, there is provided a method for generating red, green, blue (RGB) primaries for a wide color gamut, the method including: setting a target gamut with respect to a reference gamut, based on set RGB primaries; determining whether a gamut coverage of the target gamut with respect to the reference gamut meets a gamut coverage threshold; and maximizing a gamut efficiency of the target gamut by maximizing the gamut coverage of the target gamut while minimizing a quantization error, when the gamut coverage meets the gamut coverage threshold.

The method may further include determining whether the set RGB primaries belong to a range of a unique hue for maintaining a locus recognized as the same hue.

According to example embodiments, a wide color gamut implementing natural colors unachievable by a conventional standard RGB (sRGB) color gamut may be acquired, by setting red, green, and blue (RGB) primaries to meet various conditions.

According to example embodiments, gradation of an image may be gently expressed, by setting the RGB primaries showing a color gamut having a maximum gamut efficiency and a minimum quantization efficiency.

In addition, according to example embodiments, color balance may be maintained by setting the RGB primaries to meet a constant hue representing a unique hue.

BRIEF DESCRIPTION OF THE DRAWINGS

These and/or other aspects and advantages will become apparent and more readily appreciated from the following description of the embodiments, taken in conjunction with the accompanying drawings of which:

FIG. 9 illustrates a process of setting RGB primaries, according to example embodiments.

DETAILED DESCRIPTION

Figure 1:
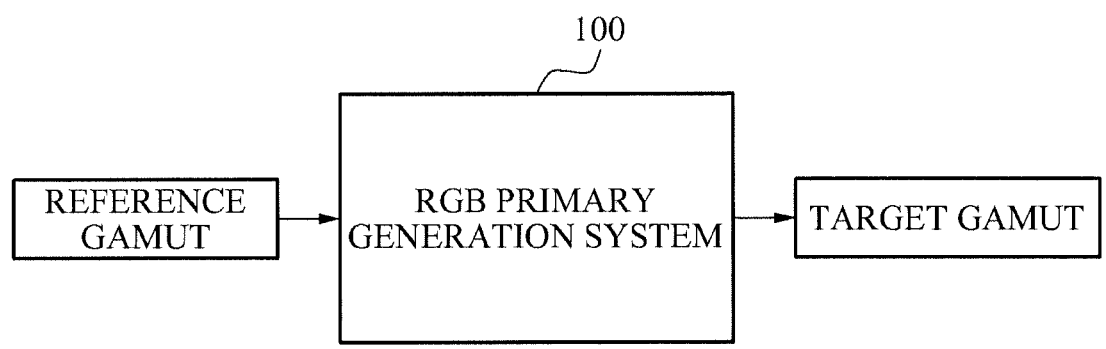
FIG. 1 illustrates operation of a red, green, and blue (RGB) primary generation system, according to example embodiments.

Reference will now be made in detail to example embodiments, examples of which are illustrated in the accompanying drawings, wherein like reference numerals refer to the like elements throughout. Example embodiments are described below in order to explain example embodiments by referring to the figures. A red, green, and blue (RGB) primary generation method according to example embodiments may be performed by an RGB primary generation system.

FIG. 1 illustrates operation of an RGB primary generation system 100, according to example embodiments.

The RGB primary generation system 100 may set a relatively wide target gamut with respect to a reference gamut. For example, the reference gamut may be a standard RGB (sRGB) gamut. In this instance, the target gamut may express colors beyond the sRGB gamut.

The RGB primary generation system 100 may set RGB primaries (1) having a maximum gamut coverage with respect to the reference gamut, (2) having a maximum gamut efficiency and a minimum quantization error rate, and (3) meeting a range of a constant hue. Here, the RGB primaries denote red (R), green (G), and blue (B), respectively located in predetermined color spaces.

That is, although it is preferred that a gamut size generated from the RGB primaries is larger, the large gamut size may increase a quantization error since a number of bits for expressing digital signals is limited. While the quantization error may be reduced when setting the RGB primaries with respect to a relatively small gamut, such as, the sRGB gamut, object colors existing in nature may not be implemented. Furthermore, when the RGB primaries are not located according to a predetermined standard in the Commission Internationale de L'eclairage (CIE)-u'v' color space, color balance may be broken and, accordingly, colors may not be normally implemented. Accordingly, the RGB primary generation system 100 may set the RGB primaries to meet the preceding conditions.

Figure 2:
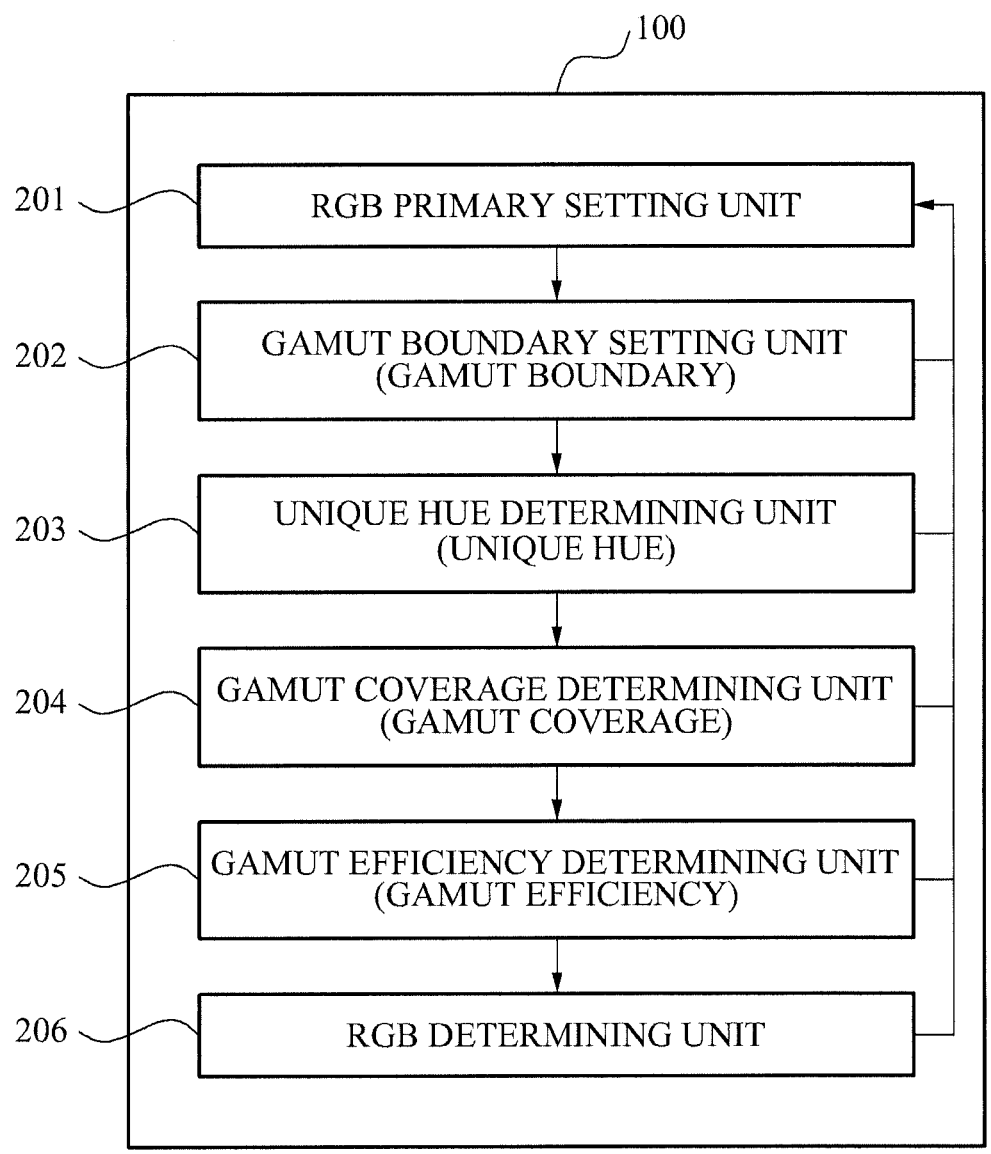
FIG. 2 illustrates a detailed structure of the RGB primary generation system, according to the example embodiments.

FIG. 2 illustrates a detailed structure of the RGB primary generation system according to the example embodiments.

Referring to FIG. 2, the RGB primary generation system 100 may include an RGB primary setting unit 201, a gamut boundary setting unit 202, a unique hue determining unit 203, a gamut coverage determining unit 204, a gamut efficiency determining unit 205, and an RGB determining unit 206.

The RGB primary setting unit 201 may set initial RGB primaries with respect to a particular color space. The set RGB primaries may be varied as long as predetermined conditions are met.

The gamut boundary setting unit 202 may set a gamut boundary of the reference gamut, using a data set in the particular color space. In this case, the data set may include at least one of an object color and a display color. For example, the gamut boundary setting unit 202 may set the data set of the CIE-u'v' color space from a data sample, for example, a pointer, a standard object color spectra (SOCS), and a display such as a liquid crystal display (LCD), organic light emitting diode (OLED), and the like. In addition, the gamut boundary setting unit 202 may set the gamut boundary from the data set. A process of setting the gamut boundary will be described in further detail with reference to FIG. 4.

The unique hue determining unit 203 may determine whether the RGB primaries belong to a range of a unique hue for maintaining a locus recognized as the same hue. The locus recognized as the same hue may be defined as the constant hue. The constant hue may be defined with respect to R, G, B, cyan (C), magenta (M), and yellow (Y).

For example, the unique hue determining unit 203 may determine whether the RGB primaries meet the constant hue locus, using Equation 1 shown below.

$$H_M < H_R < H_Y, H_Y < H_G < H_C, H_C < H_B < H_M \qquad \text{Equation 1}$$

In particular, with respect to the RGB primaries, the unique hue determining unit 203 may determine whether R is located between M and Y, whether G is located between Y and C, and whether B is located between C and M. When the RGB primaries, which are initially set, do not meet the constant hue, the RGB primary setting unit 201 may reset the RGB primaries. When the RGB primaries meet the constant hue, colors may be naturally implemented without color distortion.

The gamut coverage determining unit 204 may determine whether a gamut coverage of the target gamut meets a gamut coverage threshold, using the reference gamut and the target gamut, based on the RGB primaries. Within the gamut coverage, the target gamut determined through the RGB primaries may cover a reference gamut of an actual object color or display color.

That is, the gamut coverage determining unit 204 may determine whether a gamut coverage overlapping the reference gamut and the target gamut exceeds the gamut coverage threshold. For example, the gamut coverage determining unit 204 may calculate the gamut coverage, according to Equation 2.

$$\text{Gamut Coverage} = \frac{\text{Overlapped volume between target gamut and reference gamut}}{\text{Referece gamut volume}} \quad \text{Equation 2}$$

When the gamut coverage does not exceed the gamut coverage threshold, the RGB primary setting unit 201 may reset the RGB primaries.

When the gamut coverage meets the gamut coverage threshold, the gamut efficiency determining unit 205 may determine whether the gamut efficiency of the target gamut is at a maximum, using the target gamut and the reference gamut. For example, the gamut efficiency determining unit 205 may determine whether the gamut efficiency of the target gamut is at a maximum while the quantization error is at a minimum.

For example, the gamut efficiency determining unit 205 may determine whether the gamut efficiency is at a maximum, according to Equation 3.

$$\text{If target volume is larger than reference volume,} \quad \text{Equation 3}$$
$$\text{Gamut Efficiency} = \frac{\text{Reference gamut volume}}{\text{Target gamut volume}}$$
$$\text{Else}$$
$$\text{Gamut Efficiency} = \frac{\text{Target gamut volume}}{\text{Reference gamut volume}}$$

As aforementioned, the gamut coverage may be large. However, when the gamut coverage is set to be too great, the gamut efficiency may decrease, thereby increasing a maximum quantization error. That is, when the gamut is set to be great through the RGB primaries, colors beyond the conventional sRGB may be implemented. However, in this case, gradation may not be gently expressed, generating steps due to the increased maximum quantization error. The maximum quantization error may be a maximum value of color difference values with respect to a combination of all code values with a difference of 1 in the color space. The maximum quantization error increases, proportionally, as the target gamut size increases. When the maximum quantization error is small, gradation of an image applied to a display may be gently expressed.

The RGB determining unit 206 may control the gamut coverage threshold by determining whether the RGB primaries are real colors. When the RGB primaries are not real colors, the gamut coverage threshold may be reduced. The reduced gamut coverage threshold may be applied to the gamut coverage determining unit 204.

Figure 3:
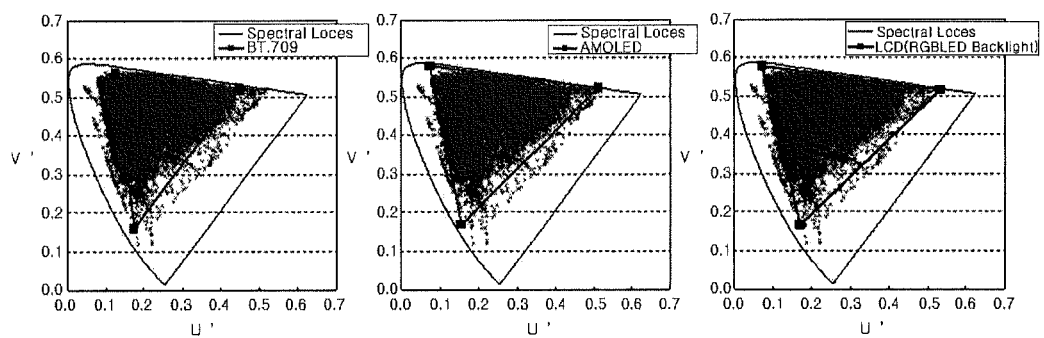
FIG. 3 illustrates a comparison between an object color gamut and a display color gamut in the Commission Internationale de L'eclairage (CIE)-u'v' color space, according to example embodiments.

FIG. 3 illustrates a comparison between an object color gamut and a display color gamut in a CIE-u'v' color space, according to example embodiments.

In FIG. 3, the dots denote a pointer and SOCS data. Color gamuts defined by the region formed by three rectangular dots denote color gamuts of an object BT.709, an active-matrix OLED (AMOLED), and an LCD, respectively. The reference gamut may include the object color or the display color. Depending on structures of the system, the reference gamut may include only the object color or additionally include another display color gamut.

Figure 4:
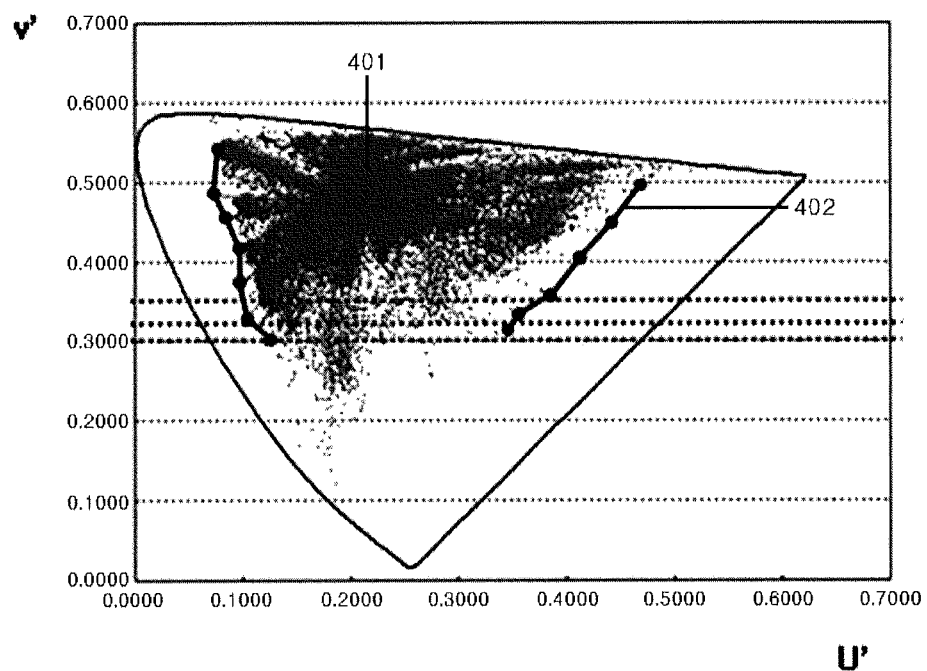
FIG. 4 illustrates a process of setting a gamut boundary with respect to a data set, according to example embodiments.

FIG. 4 illustrates a process of setting a gamut boundary with respect to a data set, according to example embodiments.

The gamut boundary setting unit 202 may set the gamut boundary of the reference gamut using the data set in a particular color space. For example, the gamut boundary may be set by dividing a color gamut by a predetermined interval along a v'-axis with respect to a u'v' data set 401 located on a CIE-u'v' plane, and then connecting a maximum u' value and a minimum u' value in all divided sections of the v'-axis.

With respect to the u'v' data set 401, the gamut boundary setting unit 202 may divide the color gamut by the predetermined interval along the v'-axis. As the interval becomes smaller, the density of the gamut boundary increases. As the interval becomes greater, the density decreases. In addition, the gamut boundary setting unit 202 may obtain the maximum u' value and the minimum u' value with respect to the data divided along the v'-axis. Accordingly, the gamut boundary setting unit 202 may set the gamut boundary by connecting the maximum u' value and the minimum u' value obtained with respect to all the divided sections of v' values.

Figure 5:
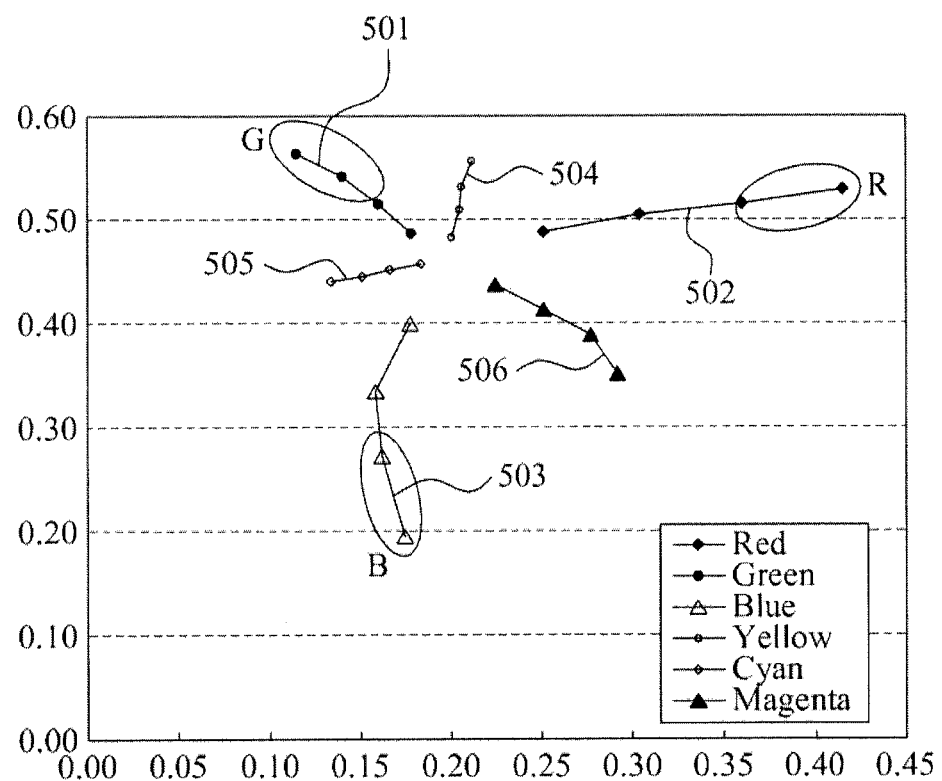
FIG. 5 illustrates a determination of whether RGB primaries set, according to example embodiments, meet a constant hue.

FIG. 5 illustrates a determination of whether RGB primaries, set according to example embodiments meets, a constant hue.

FIG. 5 shows constant hue loci related to R, G, B, C, M, and Y hues for setting RGB primary signals. As aforementioned, the constant hue denotes loci 501, 502, 503, 504, 505, and 506, each of which connects spots recognized as the same hue with respect to the respective R, G, B, C, M, and Y primaries. Here, the RGB primaries set by the RGB primary setting unit 201 need to meet the constant hue loci. When the RGB primaries do not meet the constant hue loci, color balance may be broken.

According to FIG. 5, an R locus 502 needs to be located between an M locus 506 and a Y locus 504. A G locus 501 needs to be located between the Y locus 504 and a C locus 505. A B locus 503 needs to be located between the C locus 505 and the M locus 506.

Figure 6:
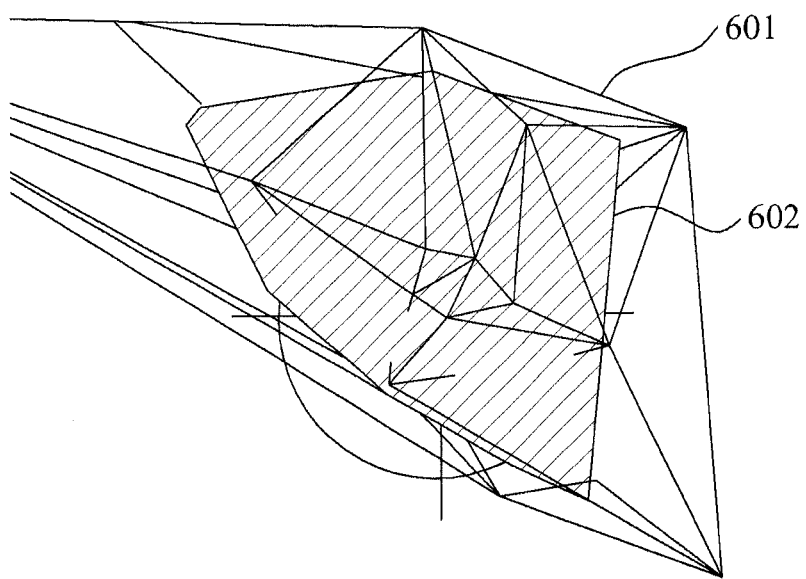
FIG. 6 illustrates a result of comparison between a reference gamut and a target gamut, according to example embodiments.

FIG. 6 illustrates a result of comparison between the reference gamut 602 and the target gamut 601, according to example embodiments.

As aforementioned, the RGB primary generation system 100 may set the RGB primaries for setting a wider target gamut 601 than the reference gamut 602 with respect to the object color and the display color. Here, the RGB primary generation system 100 may set the RGB primaries such that the target gamut 601, according to the RGB primaries, covers as much of the reference gamut 602 as possible. However, in this case, the target gamut 601 needs to have a maximum gamut efficiency and a minimum quantization error. In addition, the RGB primaries of the target gamut need to meet the constant hue and to be real colors.

The RGB primaries set according to the example embodiments may have values as shown in Table 1 below, in the CIE-u'v' color space. The provided values serve only as an example and do not limit the present disclosure.

TABLE 1

| Parameter | Primary | u' | v' |
| --- | --- | --- | --- |
| Primaries(u'v' chromaticity coordinates) | Red | 0.5399 | 0.5190 |
| | Green | 0.035 | 0.5859 |
| | Blue | 0.165 | 0.1182 |
| White | D65 | 0.1978 | 0.4683 |

Figure 7:
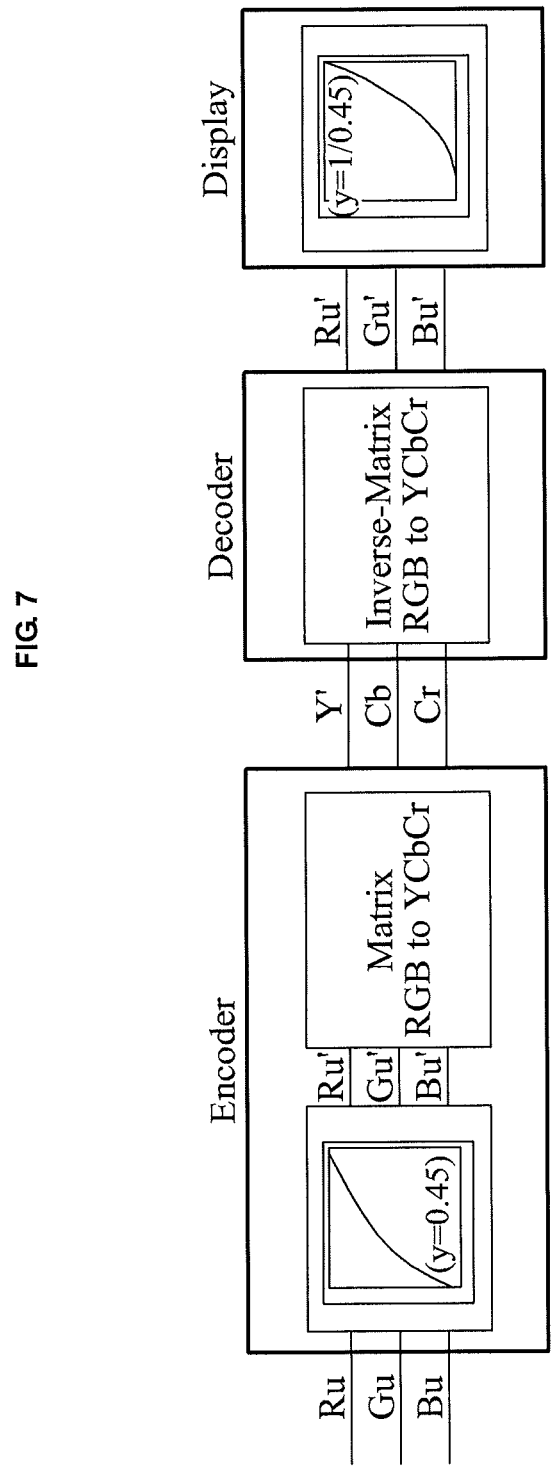
FIG. 7 illustrates an example of a color encoding system using RGB primaries set, according to example embodiments.

FIG. 7 illustrates an example of color encoding system using RGB primaries set according to example embodiments.

Referring to FIG. 7, an encoder may generate a Ru'Gu'Bu' signal, which is a non-linear signal, from Ru, Gu, and Bu signals, which are inputted RGB signals, using BT.709 Gamma (γ=0.45), for example. In addition, the encoder may convert the non-linear Ru'Gu'Bu' signal into a Y'CbCr signal, using an RGB-to-YCbCr matrix, based on the RGB primaries, set according to the example embodiments.

According to the example embodiments, the color encoding system may use a calculation result according to Table 2 below. Here, the luma and color-difference equation is a result of applying the RGB primaries.

TABLE 2

| Parameters | Values and equations |
|---|---|
| 1. Opto-electronic transfer characteristics | $E' = \begin{cases} 4.5L, & 0 \leq L < 0.0181 \\ 1.0993L^{0.45} - 0.0993, & 0.0181 \leq L \leq 1 \end{cases}$ <br><br> where L denotes a red, green, or blue tristimulus value and E' denotes a nonlinear primary component. |
| 2. Luma and color-difference equations | $E_Y' = 0.2965 E_R' + 0.6497 E_G' + 0.0538 E_B'$ <br><br> $E_{CB}' = \frac{0.5}{(1-0.0538)}(E_B' - E_Y') = -0.1567 E_R' - 0.3433 E_G' + 0.5000 E_B'$ <br><br> $E_{CR}' = \frac{0.5}{(1-0.2965)}(E_R' - E_Y') = 0.5000 E_R' - 0.4618 E_G' - 0.0382 E_B'$ |
| 3. Quantization of non-linear RGB components, luma, and color-difference signals | $D_Y' = \text{INT}[(219 E_Y' + 16) \cdot 2^{n-8}]$    $D_R' = \text{INT}[(219 E_R' + 16) \cdot 2^{n-8}]$ <br> $D_{CB}' = \text{INT}[(224 E_{CB}' + 128) \cdot 2^{n-8}]$    $D_G' = \text{INT}[(219 E_G' + 16) \cdot 2^{n-8}]$ <br> $D_{CR}' = \text{INT}[(224 E_{CR}' + 128) \cdot 2^{n-8}]$    $D_B' = \text{INT}[(219 E_B' + 16) \cdot 2^{n-8}]$ <br> where "n" denotes the number of bit-length of the quantized RGB, luma, and color-difference signals. |

A decoder may generate the Ru'Gu'Bu' signal from the Y'CbCr signal using the RGB-to-YCbCr matrix which is an inverse-matrix, and then transmit the Ru'Gu'Bu' signal to a display. The display may linearize the Ru'Gu'Bu' signal using a gamma value that is the same as used in the encoder, and output the linearized signal.

Figure 8:
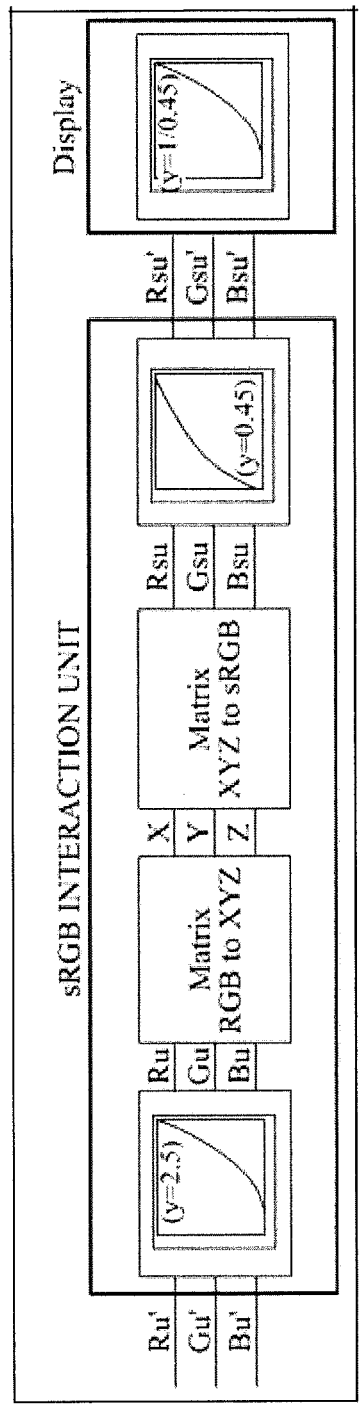
FIG. 8 illustrates an example of a color encoding system which is compatible with BT.709 RGB, according to example embodiments.

FIG. 8 illustrates an example of color encoding system which is compatible with BT.709 RGB, according to example embodiments.

For a compatible use with the BT.709 RGB, an sRGB interaction unit may linearize the Ru'Gu'Bu' signal output from the decoder shown in FIG. 7, using the BT.709 Gamma (γ=1/0.45), thereby generating an RuGuBu signal. In addition, the sRGB interaction unit may convert the linear RuGuBu signal into an XYZ signal, using an RGB-XYZ matrix. Next, the sRGB interaction unit may generate an RsuGsuBsu signal from the XYZ signal, using an XYZ-sRGB matrix, and generate an Rsu'Gsu'Bsu' signal using the BT.709 Gamma. Here, the RGB signal may be a non-clipped signal including a negative value smaller than 0 and a value greater than 1. The display may linearize the Rsu'Gsu'Bsu' signal using the gamma value and clip the Rsu'Gsu'Bsu' signal, thereby outputting an RsGsBs signal.

FIG. 9 illustrates a process of setting RGB primaries, according to example embodiments.

The RGB primary generation system 100 may set initial RGB primaries in operation S901. Here, a gamut coverage threshold may be 100%.

The RGB primary generation system 100 may set a CIE-u'v' data set in operation S902. The CIE-u'v' data set may include at least one of an object color and a display color.

The RGB primary generation system 100 may set a gamut boundary of a reference gamut using the CIE-u'v' data set in operation S903. For example, the RGB primary generation system 100 may divide a color gamut by a predetermined interval along a v'-axis with respect to a u'v' data set located on a CIE-u'v' plane, and then connect a maximum u' value and a minimum u' value in all divided sections of the v'-axis.

The RGB primary generation system 100 may set a unique hue in operation S904. Here, the unique hue may denote a constant hue with respect to the aforementioned R, G, B, C, M, and Y hues.

The RGB primary generation system 100 may determine whether the RGB primaries belong to a range of a unique hue for maintaining a locus recognized as the same hue, in operation S905. For example, the RGB primary generation system 100 may determine whether R is located between M and Y, G is located between Y and C, and B is located between C and M, with respect to the RGB primaries. When the RGB primaries do not belong to the range of the unique hue, the RGB primary generation system 100 may reset the RGB primaries in operation S910.

The RGB primary generation system 100 may calculate a gamut coverage of a target gamut in operation S906. The gamut coverage may be calculated, according to Equation 2.

The RGB primary generation system 100 may determine whether the gamut coverage of the target gamut meets a predetermined gamut coverage threshold T in operation S907. When the gamut coverage does not meet the predetermined gamut coverage threshold T, the RGB primary generation system 100 may reset the RGB primaries in operation S910.

The RGB primary generation system 100 may calculate a gamut efficiency of the target gamut, using the target gamut and the reference gamut in operation S908. The gamut efficiency may be calculated according to Equation 3.

The RGB primary generation system 100 may determine whether the gamut efficiency of the target gamut is at a maximum in operation S909. Here, in particular, the RGB primary generation system 100 may determine whether the gamut efficiency is at a maximum while a quantization error is at a minimum. When the gamut efficiency is not at a maximum, the RGB primary generation system 100 may reset the RGB primaries in operation S910.

The RGB primary generation system 100 may determine whether the RGB primaries are real colors in operation S911. When the RGB primaries are not real colors, the RGB primary generation system 100 may reduce the gamut coverage threshold T in operation 5912, and then reset the RGB primaries in operation 910.

Features not described with reference to FIG. 9 may be appreciated by referencing FIGS. 1 to 8.

In addition, the RGB primary generation method according to example embodiments includes computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the RGB primary generation system 100 may include at least one processor to execute at least one of the above-described units and methods.

The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. A red, green, and blue (RGB) primary generation system, comprising:
    an RGB primary setting unit to set RGB primaries;
    a gamut boundary setting unit to set a gamut boundary of a reference gamut using a data set in a color space;
    a gamut coverage determining unit to determine whether a gamut coverage of a target gamut meets a gamut coverage threshold, using the reference gamut and the target gamut, based on the set RGB primaries; and
    a gamut efficiency determining unit to determine whether a gamut efficiency of the target gamut is at a maximum, using the target gamut and the reference gamut, when the gamut coverage meets the gamut coverage threshold.

2. The RGB primary generation system of claim 1, wherein the data set comprises at least one of an object color and a display color.

3. The RGB primary generation system of claim 1, wherein the gamut boundary setting unit sets the gamut boundary by dividing a color gamut by a predetermined interval along a v'-axis with respect to a u'v' data set located on a CIE-u'v' plane and connecting a maximum u' value and a minimum u' value in all divided sections of the v'-axis.

4. The RGB primary generation system of claim 1, further comprising a unique hue determining unit to determine whether the set RGB primaries belong to a range of a unique hue for maintaining a locus recognized as the same hue.

5. The RGB primary generation system of claim 4, wherein the unique hue determining unit determines whether R is located between magenta (M) and yellow (Y), G is located between Y and cyan (C), and B is located between C and M.

6. The RGB primary generation system of claim 1, wherein the gamut coverage determining unit determines whether the gamut coverage overlapping the reference gamut and the target gamut exceeds the gamut coverage threshold.

7. The RGB primary generation system of claim 1, wherein the gamut efficiency determining unit determines whether the gamut efficiency of the target gamut is at a maximum while a quantization error is at a minimum.

8. The RGB primary generation system of claim 1, further comprising an RGB determining unit to control the gamut coverage threshold by determining whether the RGB primaries are real colors.

9. The RGB primary generation system of claim 8, wherein the RGB determining unit reduces the gamut coverage threshold when the RGB primaries are not real colors.

10. A red, green, and blue (RGB) primary generation method, comprising:
    setting, by at least one processing device, RGB primaries;
    setting a gamut boundary of a reference gamut using a data set in a color space;
    determining whether a gamut coverage of a target gamut meets a gamut coverage threshold using the reference gamut and the target gamut, based on the set RGB primaries; and
    determining whether a gamut efficiency of the target gamut is at a maximum, using the target gamut and the reference gamut, when the gamut coverage meets the gamut coverage threshold.

11. The RGB primary generation method of claim 10, further comprising determining whether the set RGB primaries belong to a range of a unique hue for maintaining a locus recognized as the same hue.

12. The RGB primary generation method of claim 10, wherein the determining of whether the gamut efficiency of the target gamut is at a maximum comprises:
    determining whether the gamut efficiency of the target gamut is at a maximum and a quantization error is at a minimum.

13. The RGB primary generation method of claim 10, further comprising:
    controlling the gamut coverage threshold by determining whether the RGB primaries are real colors, wherein the controlling of the gamut coverage threshold comprises reducing the gamut coverage threshold when the RGB primaries are not real colors.

14. A non-transitory computer-readable medium comprising a program for instructing a computer to perform the method of any of claim 10.

15. The RGB primary generation method of claim 10, wherein the RGB primaries comprise at least one subset {R, G, B}={(0.5399, 0.5190), (0.035, 0.5859), (0.165, 0.1182)} when a color space coordinate set in an internationale de l'eclairage (CIE)-u'v' color space is {R, G, B}={(u1, v1), (u2, v2), (u3, v3)}.

16. A method for generating red, green, blue (RGB) primaries for a wide color gamut, the method comprising:
    setting, by at least one processing device, a target gamut with respect to a reference gamut, based on set RGB primaries;
    determining whether a gamut coverage of the target gamut with respect to the reference gamut meets a gamut coverage threshold; and
    determining whether to reset the RGB primaries based on a gamut efficiency of the target gamut, when the gamut coverage meets the gamut coverage threshold.

17. The method of claim 16, further comprising determining whether the set RGB primaries belong to a range of a unique hue for maintaining a locus recognized as the same hue.

18. The method of claim 16, further comprising controlling the gamut coverage threshold by determining whether the set RGB primaries are real colors, and reducing the gamut coverage threshold when the set RGB primaries are not real colors.

19. The method of claim 16, wherein the gamut efficiency is determined by calculating a reference gamut volume divided by a target gamut volume, when the target gamut volume is larger than the reference gamut volume.

20. The method of claim 16, wherein the determining whether to reset the RGB primaries comprises determining whether the gamut efficiency of the target gamut is at a maximum while a quantization error is at a minimum.

* * * * *